United States Patent [19]

Heinle

[11] Patent Number: 4,839,589
[45] Date of Patent: Jun. 13, 1989

[54] METHOD AND CIRCUIT FOR DETERMINING THE SPEED OF ROTATION OF A ROTATING MACHINE

[75] Inventor: Georg Heinle, Erlangen, Fed. Rep. of Germany

[73] Assignee: Siemens Aktiengesellschaft, Berlin and Munich, Fed. Rep. of Germany

[21] Appl. No.: 926,443

[22] Filed: Nov. 3, 1986

[30] Foreign Application Priority Data

Dec. 12, 1985 [DE] Fed. Rep. of Germany ....... 3543941

[51] Int. Cl.$^4$ ............................................. G01P 3/48
[52] U.S. Cl. ..................................... 324/166; 318/801
[58] Field of Search ............... 324/158 MG, 166, 177, 324/160, 163, 161; 310/168; 318/801, 802, 803, 806, 798; 307/87, 83; 361/33, 61, 85

[56] References Cited

U.S. PATENT DOCUMENTS 4,410,845 10/1983 Lockyear ........................... 361/28 X

FOREIGN PATENT DOCUMENTS 0027204 9/1980 European Pat. Off. .
0071848 7/1982 European Pat. Off. .
0095041 4/1983 European Pat. Off. .
0143331 10/1984 European Pat. Off. .
2630733 1/1978 Fed. Rep. of Germany .
2945952 5/1981 Fed. Rep. of Germany .
3341173 5/1985 Fed. Rep. of Germany ...... 324/177

Primary Examiner—A. D. Pellinen
Assistant Examiner—Morris Ginsburg
Attorney, Agent, or Firm—Kenyon & Kenyon

[57] ABSTRACT

A method is presented in which at least one of the sinusoidal voltages ($U_S$) which is induced in the stator windings by the residual magnetism or remanence of the rotor in a rotating-field machine, the frequency of which corresponds to the rotor speed is converted into a symmetrical square wave signal, ($U_R$), the frequency and the phase of this square wave signal ($U_R$) matching with the frequency and the phase of the induced sinusoidal voltage ($U_S$). From this square wave signal ($U_R$), an output signal ($U_{DA}$) proportional to the frequency thereof is generated. Thus, a method is obtained by which the time required for finding the operational speed of the rotating-field machine (2) is reduced considerably so that a frequency converter can be connected to the rotating-field machine (2) rapidly at a synchronous speed.

14 Claims, 2 Drawing Sheets

METHOD AND CIRCUIT FOR DETERMINING THE SPEED OF ROTATION OF A ROTATING MACHINE

BACKGROUND OF THE INVENTION

1. Field of the Invention

The invention relates to a method and circuit for determining the speed of a rotating field or polyphase machine by monitoring the voltage induced in the stator by rotation of the rotor.

2. Description of the Prior Art

Devices for determining the speeds of polyphase asynchronous machines are available commercially, in which a converter can be connected to a rotating asynchronous machine. The frequency converter impresses on the asynchronous machine a reference sinusoidal current which may, for instance, be the rated current of the asynchronous machine. The converter traverses the frequency band of the asynchronous machine being measured by varying the current frequency from at D.C. and toward a maximum frequency. During this start-up process, the magnetic flux of the machine is monitored. As long as the frequency of the converter deviates from the frequency of the machine by more than the nominal slippage of the asynchronous machine, i.e., is outside the frequency band or window of the machine, the magnetic flux is very small. If the deviation between the converter frequency and the machine frequency becomes smaller than the nominal slippage of the asynchronous machine, the flux builds up at a flux time constant. The point at which the flux exceeds a predetermined limit, is used as an indication that the converter frequency and the machine frequency are approximately equal, i.e., the operating speed of the rotating polyphase asynchronous machine has been found. As soon as this criterion is met, the converter is switched to normal operation.

The search for the operating speed of the rotating asynchronous machine or a synchronous machine, is time consuming because a sufficiently large magnetic flux must be build up in the rotating-field machine while the converter traverses its frequency window. The predetermined value of the magnetic flux is exceeded only if there is sufficient time spent within the machine's frequency window for the flux to be built up. If the searching rate is increased, it may be possible that the frequency window is traversed too fast, whereby, sufficient flux cannot build up to exceed the predetermined magnetic flux value. Without exceeding this level, the operating speed of the rotating polyphase machine cannot be found and the converter cannot be connected to this machine, in order, for instance, to accelerate it again. In addition, the converter output voltage or the converter output current must have the same frequency and given the same phase as the polyphase machine when the converter is connected thereto. Since rotating-field machines usually have no tachometer generators, it is not possible to connect the converter to the machine at the operating frequency.

SUMMARY OF THE INVENTION

It is now an object of the invention to improve the method mentioned above in such a manner that the speed of a polyphase machine is determined without a tachometer generator, and considerably faster, whereby the converter can be connected to the polyphase machine with the frequency corresponding to the rotor speed.

In the method according to the invention, at least one of a sinusoidal voltage signals which are induced in the stator windings by the remanence of the rotor is evaluated, the frequency of which corresponds to the rotor speed. In the process, at least one sinusoidal voltage, which is present at a stator terminal, is converted into a symmetrical square wave signal by means of a square wave converter. The frequency and the phase of the square wave signal correspond to the frequency and the phase of the induced sinusoidal voltage. Subsequently, an output signal, the frequency of which is proportional to the frequency of this square wave voltage is thereby formed. Since the frequency or the period of this induced sinusoidal voltage does not depend on the type or the temperature of the machine, a method is obtained which is applicable for polyphase machines generally. After the speed of the polyphase machine is determined, the converter can be connected to the polyphase machine on the said converter generating current at the frequency corresponding to the rotor speed. The time for determining the speed decreased considerably because with this method, the search rate is no longer dependent on the frequency window of the polyphase machine.

For determining the speed of a rotating polyphase machine even faster, three phase sinusoidal voltages induced by the remanence of the rotor are evaluated. In the process, the sinusoidal voltages which are induced in the stator by the remanence of the stator are converted into symmetrical square wave signals by means of a square wave converter. Each of these square wave signals are transformed into clock signals via a monostable multivibrator. From these clock signals, an output signal proportional to their frequency is then generated. By this three-phase method the time for determining the speed is reduced substantially because, as compared to the single-phase method, three sinusoidal voltages are evaluated, the clock signals of which are phase-shifted by 120°. Thus, three times as many clock signals per period are obtained for forming an output signal as compared with the single-phase method. This has a particularly favorable effect at low speeds of a rotating polyphase machine.

To determine the speed of a rotating polyphase machine operating at low speeds even faster, auxiliary signals with arbitrarily adjustable phases are formed from two sinusoidal voltages induced in the stator windings. Thus, the number of clock signals can be generated, from which a signal proportional to the speed is formed. This reduces the time for determining the speed substantially. This method is particularly effective at very low speeds of the rotating polyphase machine.

BRIEF DESCRIPTION OF THE DRAWINGS

For a further explanation of the invention, reference is made to the drawing, in which an arrangement for carrying out the method according to the invention is illustrated schematically; wherein.

DETAILED DESCRIPTION OF THE INVENTION

Figure 1:
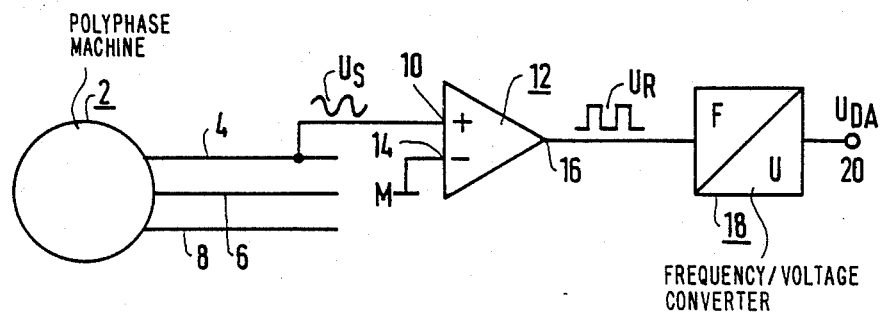
FIG. 1 shows a single-phase circuit arrangement according to the invention for determining the speed of a rotating polyphase machine from the frequency of the induced voltages.

In FIG. 1, a single-phase circuit arrangement for determining the speed of a rotating polyphase machine 2 is shown having three stator terminals 4, 6, 8. One stator terminal 4 is connected to a non-inverting input 10 of a comparator 12 which is provided as a square wave converter. The inverting input 14 is connected to a reference voltage M, which may be equal to the ground potential. The output 16 of the comparator 12 is connected to a frequency/voltage converter 18. At the output 20 of the latter, a speed proportional output signal $U_{DA}$ is generated.

Since the soft iron of the rotor has a small residual magnetism or remanence if the magnetic flux is already reduced, a small sinusoidal voltage $U_S$ is induced in the stator windings. These sinusoidal voltages $U_S$ can be observed at the stator terminals 4, 6 and 8. The frequency and the period of this induced sinusoidal voltage $U_S$ is independent of the type, design or temperature of the machine. One of these induced sinusoidal voltages $U_S$ is compared with the reference voltage M by means of the comparator 12. At the output 16 of the comparator 12, a square wave signal $U_R$ is obtained, the frequency and phase of which corresponds with the frequency and phase of the sinusoidal voltage $U_S$. Thus, the sinusoidal voltage $U_S$ has been converted into a proportional square wave signal $U_R$. The frequency/voltage converter 18 generates from this square wave signal $U_R$ a speed-proportional output signal $U_{DA}$ at the output 20.

With this simple circuit arrangement for carrying out the method according to the invention it is possible to determine the speed of rotating polyphase machine 2. With this determination of the speed, one is no longer dependent on the frequency window of the rotating polyphase machine 2 when searching for its operating speed. Thus, time necessary to complete the search is substantially shorter after which the converter can be connected to the rotating-field machine 2 with a frequency corresponding to the rotor speed.

Figure 2:
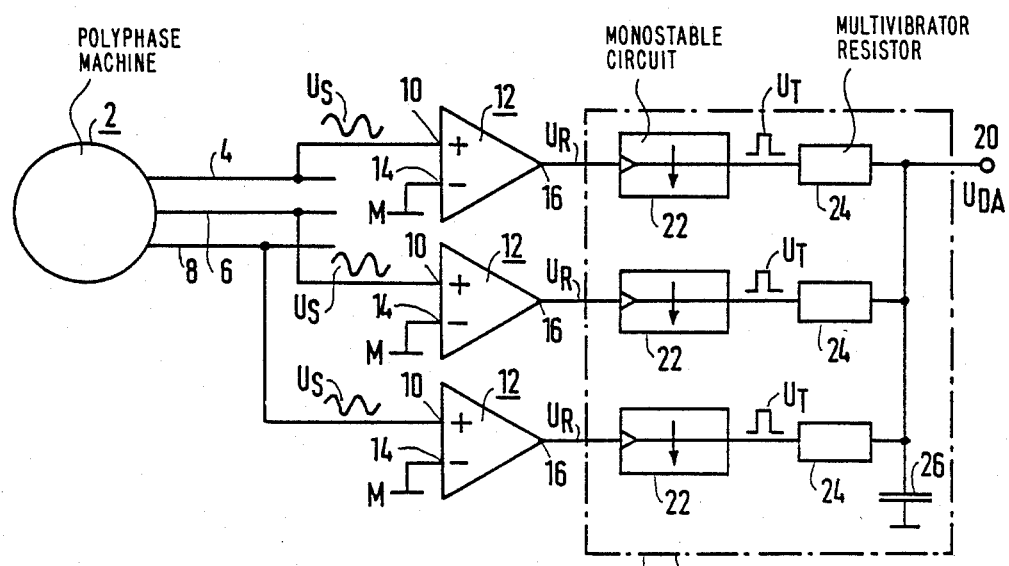
FIG. 2 shows a three-phase circuit arrangement for determining the speed of a polyphase machine from the frequency of the induced voltages.

In FIG. 2, a three-phase circuit arrangement is illustrated. Each data terminal 4, 6 and 8 is connected here to a non-inverting input 10 of a comparator 12. The inverting input 14 of the comparators 12 is connected to ground potential as the reference voltage M. Each output 16 of the comparators 12 is connected to a monostable multivibrator circuit 22. Each output of these circuits 22 is connected to a resistor 24 respectively; the outputs of the resistors 24 are jointly connected to a capacitor 26. At the junction point 20 of the resistors 24 and the capacitor 26, a speed-proportional output signal $U_{DA}$ is generated. The circuits 22, the resistors 24 and the capacitor 26 together form a frequency/voltage converter 18. The square wave voltages $U_R$ at the outputs 16 of the comparators 12 are each converted into pulse signals $U_T$ by means of the circuits 22, with each circuit 22 going briefly into an unstable state in response to each respective square wave voltage $U_R$. More particularly, a pulse signal $U_T$ corresponding to the rising edge of every square wave voltage $U_R$ is obtained. By adding the three pulse signals $U_T$, three times as many pulses are obtained, from which an analog output signal $U_{DA}$ sinusoidal proportional to the speed of the polyphase machine 2 is formed. Due to the fact that all three sinusoidal voltages $U_S$ induced in the stator windings are converted into square wave voltages $U_R$, even lower speeds of the polyphase machine 2 can be determined. In addition, the capacitor 26 can be made small since an output signal $U_{DA}$ consists of the sum of three pulse signals $U_T$. It is is a further advantage of this circuit arrangement that the direction of rotation of the still rotating field machine 2 can be determined additionally from at least two square wave voltages $U_R$ by means of a direction-of-rotation discriminator.

Figure 3:
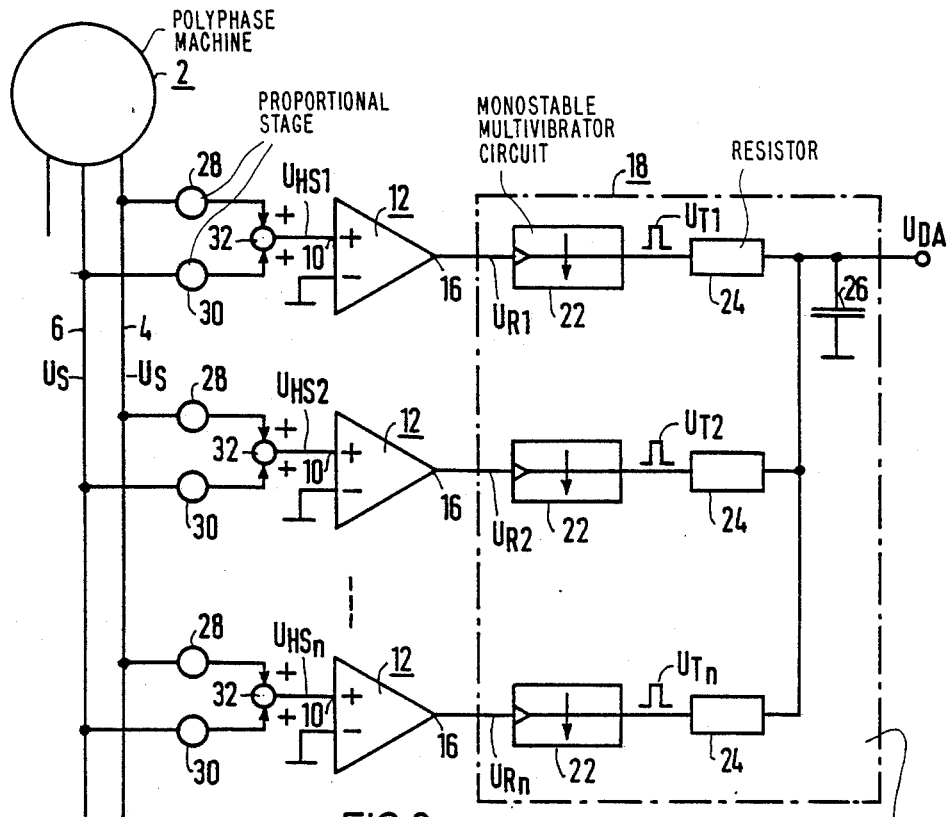
FIG. 3 shows an n-phase circuit arrangement for determining the speed from the frequency of the induced voltages.

FIG. 3 shows an n-phase circuit arrangement in which n auxiliary signals $U_{HSl}$ to $U_{HSn}$ with arbitrarily adjustable phases are formed from two sinusoidal voltages $U_S$ induced in the stator windings. These two sinusoidal voltages $U_S$ are taken off at the stator terminals 4 and 6. For each auxiliary voltage $U_{HSl}$ to $U_{HSn}$, two proportional stages 28 and 30 are provided. On the input side, each proportional stage 28 and 30 is connected to the stator terminal 4 and 6, respectively, of the polyphase machine 2. The outputs of the two proportional stages 28 and 30 are fed to an adder 32. These adders 32 are connected to the respective non-inverting input 10 of the comparators 12. Each output 16 of the comparators 12 is connected to a circuit 22. The outputs of circuit 22 are connected via a resistor 24 to a common capacitor 26. The proportional stages 28 and 30 can be set as desired. By means of these proportional stages 28 and 30, the induced sinusoidal voltages $U_S$ are weighted differently, so that by means of the adder 32, auxiliary signals $U_{HSl}$ to $U_{HSn}$ are formed which differ from each other particularly in phase. Each of these auxiliary sinusoidal voltages $U_{HSl}$ to $U_{HSn}$ is converted into a corresponding square wave signal $U_{R1}$ to $U_{RN}$ by means of the comparators 12. By means of the frequency/voltage converter 18, the square wave signals $U_{R1}$ to $U_{RN}$ are converted into pulse signals $U_{T1}$ to $U_{TN}$ which are then added to form a sum signal $U_{DA}$ proportional to the speed of the rotor of the rotating-field machine 2. Thus, a simple circuit arrangement is obtained by which very low speeds of the rotor of the polyphase machine 2 can be determined so that a converter can be connected to the machine 2.

Figure 4:
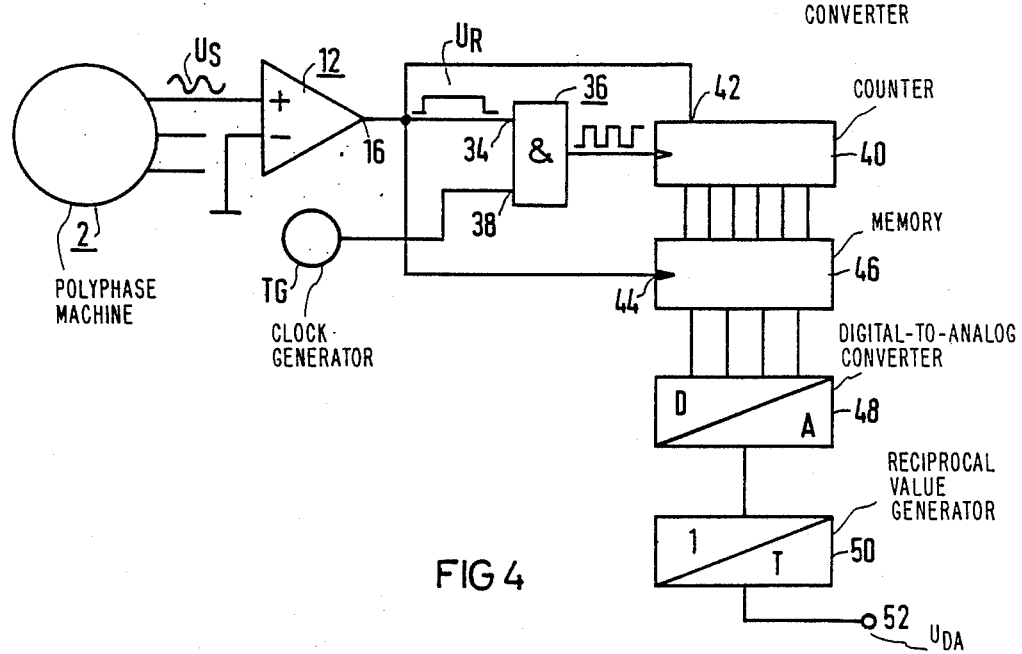
FIG. 4 shows a circuit arrangement for determining the speed from the period of the induced voltages.

In FIG. 4, a different circuit arrangement is shown which measures the period of the square wave signal $U_R$ corresponding to the induced sinusoidal voltage $U_S$. The output 16 of the comparator 12 is connected to one input 34 of an AND gate 36. The second input 38 of the AND gate 36 is connected to a clock generator TG and its output is connected to a counter 40. In addition, the output 16 of the comparator 12 is also connected to a reset input 42 of the counter 40 and a clock input 44 of a memory 46 following the counter 40. The memory 46 is followed by a digital to analog converter 48 to which there is connected a reciprocal value generator 50. The reciprocal value generator 50 generates at its output 52 an output signal $U_{DA}$ proportional to the speed of polyphase machine 2.

In this circuit arrangement, the output signal $U_{DA}$ is formed from the square wave signal $U_R$ as follows. With every positive edge of the square wave signal voltage $U_R$, the counter 40 is started. Up to the following negative edge of the square wave signal $U_R$, the counter 40 counts the clock pulses of the clock generator TG.

With the negative edge of the square wave signal $U_R$, the AND gate 36 is turned off the contents of the counter are transferred into the memory 46 and the counter 40 is reset. The digital period of the sinusoidal voltage $U_S$ present in the memory 46 may be fed to a processor for further processing. In this embodiment, the stored counter reading is converted in the digital-/analog converter 48 into an analog signal. This analog signal is converted by means of the reciprocal value generator 50 into a reciprocal proportional to the frequency of signal $U_S$. With the following positive edge of the square wave voltage $U_R$, the AND gate 36 is turned on again and the clock pulses of the clock generator TG are counted by counter 40. Thereby, a digital embodiment of the circuit arrangement for determining the speed of a polyphase machine 2 is obtained, where the period is evaluated for determining the speed of the polyphase machine 2, so that the converter can be connected to the polyphase machne 2 with a frequency corresponding to the rotor speed.

What is claimed is:

1. A method of determining the rotational speed of a rotating polyphase motor having stator windings and rotor windings comprising:
   sensing at least two sinusoidal voltage signals induced in two corresponding stator windings by remanence from said rotor windings, said sinusoidal signals having corresponding phases and a frequency indicative of said rotational speed;
   converting said sinusoidal signals into respective square wave signals wherein each square wave signal is converted by monostable multivibrators into first and second pulse signals, each pulse signal having a duty cycle, with said first pulse signals being separated in time from said second pulse signal; and
   generating an output signal which is proportional to the frequency of said first and second pulse signal.

2. The method according to claim 1, further comprising the steps of generating auxiliary voltages with arbitrarily adjustable phases from said two sinusoidal voltage signals, said auxiliary voltages being converted into corresponding symmetrical square wave signals, said square wave signals having frequencies and phases corresponding to the frequency and phase of the respective voltage.

3. A circuit arrangement for determining the speed of rotation of a rotating polyphase machine, said machine having stator windings and rotor windings, comprising:
   a plurality of stator terminals, each stator terminal being connected to one of said stator windings;
   a plurality of comparators, each having a noninverting input connected to a corresponding stator terminal for sensing a sinusoidal voltage induced in said stator winding by remanence in said rotor windings, an inverting input connected to a reference voltage, and a comparator output for generating square wave signal having a frequency and phase equal to the frequency and phase of said sinusoidal voltage, the frequency of said sinusoidal voltage being indicative of said speed of rotation; and
   a frequency-to-voltage converter having inputs connected to said comparator outputs for generating an output signal proportional to said speed of rotation.

4. The circuit arrangement of claim 3 wherein said frequency-to-voltage converter comprises:

a plurality of monostable multivibrators, each having an input connected to said comparator outputs and a monostable multivibrator output; and
   a low-pass filter connected to said monostable multivibrator outputs.

5. A circuit arrangement as defined in claim 3 wherein said frequency-to-voltage converter comprises:
   a clock generator for generating clock signals;
   an AND gate having inputs connected to said comparator outputs and to said clock generator, and a gate output;
   a counter for counting pulses on said gate output for generating a count;
   a memory for storing said count as a stored value;
   a digital-to-analog converter for converting said stored value into an analog signal; and
   a reciprocal value generator for generating an output signal from said analog signal proportional to said speed of rotation.

6. The circuit of claim 5 wherein said counter and said memory are reset by said comparator output.

7. The circuit arrangement of claim 3 wherein said frequency-to-voltage converter converts each said square wave signal into intermediate signals and combines said intermediate signals into said output signal.

8. The circuit of claim 7 wherein each of said square wave signals corresponds to one of said sinusoidal voltages.

9. The circuit of claim 8 further comprising auxiliary circuit means for combining at least two of said sinusoidal voltages into a plurality of auxiliary signals, each of said square wave signals corresponding to one of said auxiliary signals.

10. The circuit of claim 7 wherein said frequency-to-voltage converter includes period generator means for generating a period signal proportional to a period of said square wave signal, and inverting means for inverting said period signal.

11. The circuit of claim 10 wherein said period generator means includes a clock generator for generating clock signals, clock means responsive to said square wave signals and generating gated clock signals and counting means for counting the gated clock signals to generate a count.

12. The circuit of claim 10 wherein said period generator further comprises memory means for storing said count as a stored value.

13. The circuit of claim 10 wherein said period generator further comprises a digital-to-analog converter for converting said stored value into an analog period signal which is inverting by said inverter means.

14. A circuit arrangement for determining the speed of rotation of a rotating polyphase machine, said machine having stator windings and rotor windings, comprising:
   a plurality of stator terminals, each stator terminal being connected to one of said stator windings;
   a plurality of proportional stages, each being connected to one of said stator terminals, and having proportional stage outputs;
   a plurality of adders, each having a first and a second input connected to said proportional stage outputs, and adder outputs;
   a plurality of comparators, each having a noninverting input connected to said adder outputs, and comparator outputs;
   a plurality of monostable multivibrators, each having an input connected to said comparator output, and a monostable multivibrator output; and
   a low-pass filter connected to said monostable multivibrator outputs for generating an output signal proportional to said speed of rotation.

* * * * *